(12) United States Patent
Ikeda

(10) Patent No.: US 6,490,667 B1
(45) Date of Patent: Dec. 3, 2002

(54) PORTABLE ELECTRONIC MEDIUM

(75) Inventor: Hidetaka Ikeda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 09/664,347

(22) Filed: Sep. 18, 2000

(51) Int. Cl.⁷ .............................................. G06F 12/14
(52) U.S. Cl. ...................... 711/163; 711/164; 711/115; 713/200
(58) Field of Search ................................. 711/115, 163, 711/164; 235/380, 492; 713/202, 200, 201

(56) References Cited

U.S. PATENT DOCUMENTS

| | | | |
|---|---|---|---|
| 5,099,516 A | | 3/1992 | Durkin et al. |
| 5,266,782 A | * | 11/1993 | Alanara et al. ............. 235/380 |
| 5,838,793 A | | 11/1998 | Lewis |
| 6,259,773 B1 | * | 7/2001 | Sato et al. ................ 379/88.28 |

FOREIGN PATENT DOCUMENTS

| | | |
|---|---|---|
| EP | 0911738 A2 | 4/1999 |
| JP | 5-53990 | 3/1993 |
| JP | 5-265866 | 10/1993 |
| JP | 7-44378 | 2/1995 |
| JP | 8-202844 | 8/1996 |
| JP | 8-287209 | 11/1996 |
| JP | 10-244791 | 9/1998 |
| JP | 2000-172821 | 6/2000 |
| JP | 2000-194604 | 7/2000 |
| JP | 00S0731-1 | 9/2000 |
| WO | WO 98/58305 | 12/1998 |

* cited by examiner

*Primary Examiner*—Hiep T. Nguyen
(74) *Attorney, Agent, or Firm*—Pillsbury Winthrop LLP

(57) ABSTRACT

The present invention is provided with a base board on which wiring is provided, a memory, installed on the base board by soldering, for storing data and a certification key, and a memory control LSI. The memory control LSI is a fabricated as a bare chip incorporating an internal memory for storing data and a certification key, and a control section for controlling the storing of data in the memory and the reproduction of the data from the memory. The bare chip is installed on the base board and covered with sealing resin. The bare chip is connected to the base board by gold wire bonding. The certification key stored in the memory is compared with the certification key stored in the internal memory. Based on the coincidence or non-coincidence between these keys, the control section determines whether or not the memory is an intended one.

8 Claims, 14 Drawing Sheets

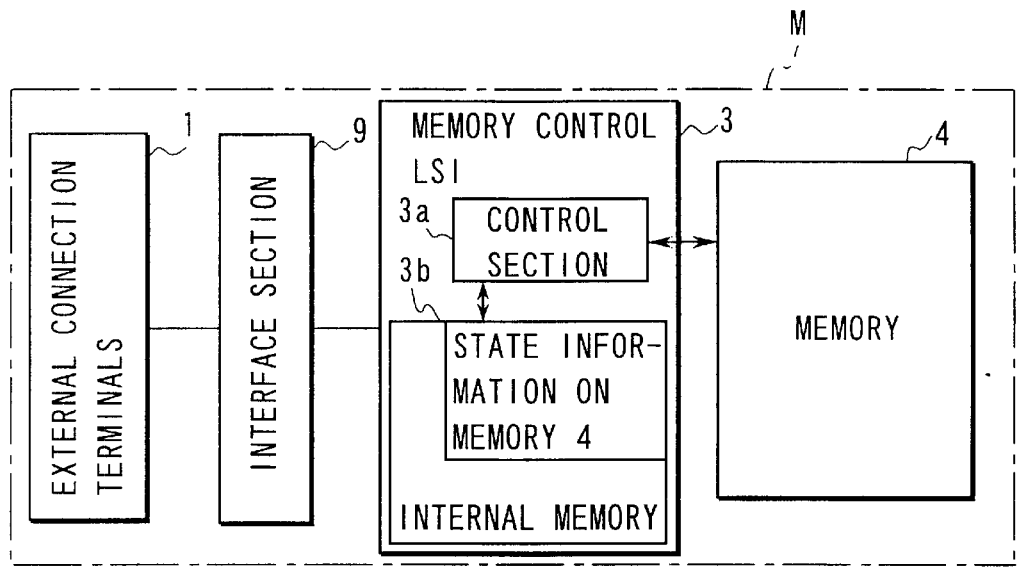
FIG. 9
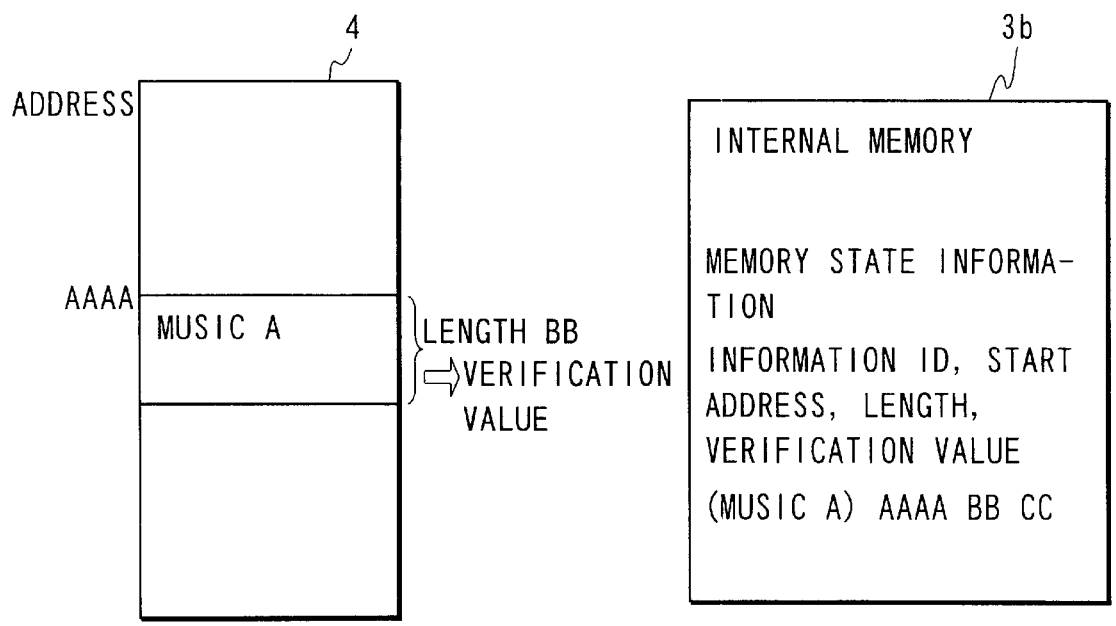
FIG. 11
FIG. 13

PORTABLE ELECTRONIC MEDIUM

BACKGROUND OF THE INVENTION

The present invention relates to a portable electronic medium which functions as a memory card, and in which a memory for storing data and a control circuit for controlling the memory are independently installed on the same card.

Where a memory for storing data and a control circuit (a control LSI) for controlling the memory are independently installed on the same card (a base board), it is general that they are soldered to the base board.

Owing to this structure, the memory can be easily replaced with a new one, and the control LSI can be detached for analysis.

In other words, a counterfeit can be made by merely replacing only the memory with another, or by increasing the storage capacity.

BRIEF SUMMARY OF THE INVENTION

The present invention has been made in consideration of the above circumstances, and is intended to prevent the installation of a memory that does not correspond to the control circuit in use, thereby preventing fabrication of a counterfeit employing such a memory.

The present invention is also intended to prevent easy analysis of the control circuit in use.

According to the present invention, there is provided a portable electronic medium comprising: a base board on which wiring is provided; a first memory, installed on the base board, for storing data and a first certification key; and a control circuit including: a second memory for storing data and a second certification key; and a control section for controlling an operation of storing data in the first memory and an operation of reading the data from the first memory, the second memory and the control section being fabricated as a chip which is installed on the base board and connected to the base board, the control section checking whether the first certification key stored in the first memory coincides with the second certification key stored in the second memory, thereby determining whether or not the first memory is an intended one.

According to the present invention, there is also provided a portable electronic medium comprising: a base board on which wiring is provided; a first memory, installed on the base board, for storing data; and a control circuit including: a second memory for storing data and a first-memory-state information; and a control section for controlling an operation of storing data in the first memory and an operation of reading the data from the first memory, the second memory and the control section being fabricated as a chip which is installed on the base board and connected to the base board, the control section checking whether the first memory is in a state coinciding with first-memory-state information stored in the second memory, thereby determining whether or not the first memory is an intended one.

According to the present invention, there is further provided a portable electronic medium comprising: a base board on which wiring is provided; a first memory, installed on the base board, for storing data and encoded data obtained by encoding a first certification key; and a control circuit including: a second memory for storing data, a second certification key, an encoding key, and a decoding program; and a control section for controlling an operation of storing data in the first memory and an operation of reproducing the data from the first memory, the second memory and the control section being fabricated as a chip which is installed on the base board and connected to the base board, the control section decoding the encoded data stored in the first memory by use of the encoding key and decoding program stored in the second memory, and further checking whether a resultant certification key coincides with the certification key stored in the second memory, thereby determining whether or not the first memory is an intended one.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention

FIG. 9 shows an example of a manner in which memory state information are stored according to the second embodiment.

FIG. 11 shows how music information edited at the end of the last-time processing is stored in the memory of the memory card according to the second embodiment.

FIG. 13 shows how memory state information are stored in an internal memory according to the second embodiment.

DETAILED DESCRIPTION OF THE INVENTION

Embodiments of the present invention will now be described.

Figure 1:
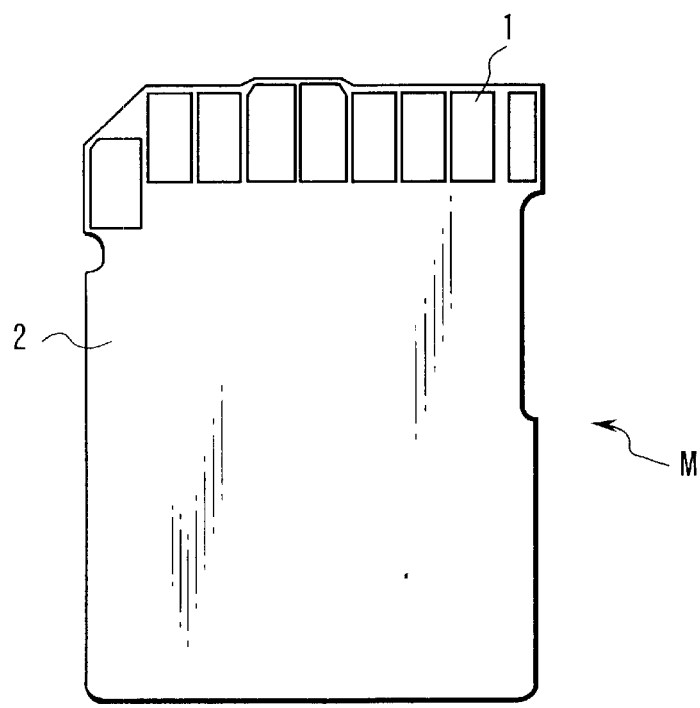
FIG. 1 shows the internal structure of a memory card according to the present invention.
Figure 2:
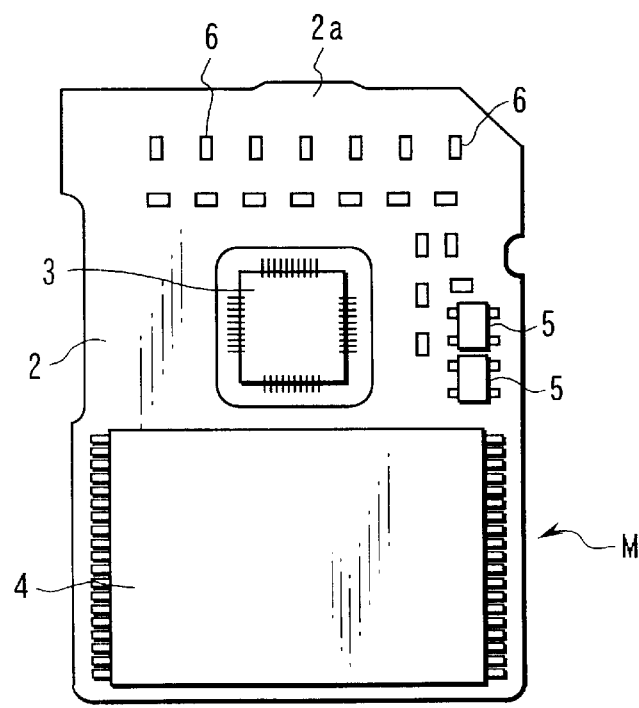
FIG. 2 shows the internal structure of the memory card.
Figure 3:
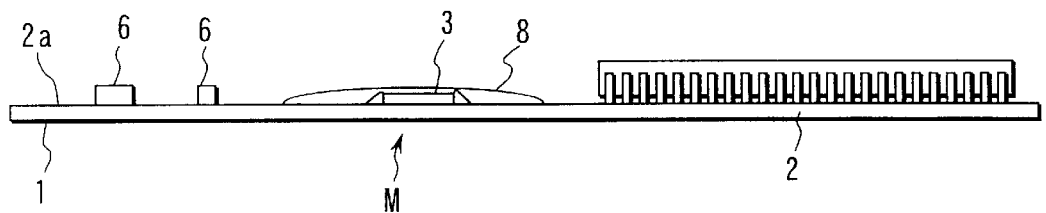
FIG. 3 shows a sectional structure of the memory card.

FIGS. 1 to 3 show the structure of a memory card M (an SD card), which is an example of a portable electronic medium. FIG. 1 shows the internal structure of the memory card M according to the present invention, FIG. 2 also shows the internal structure of the memory card M, and FIG. 3 shows a sectional structure of the memory card.

Figure 4:
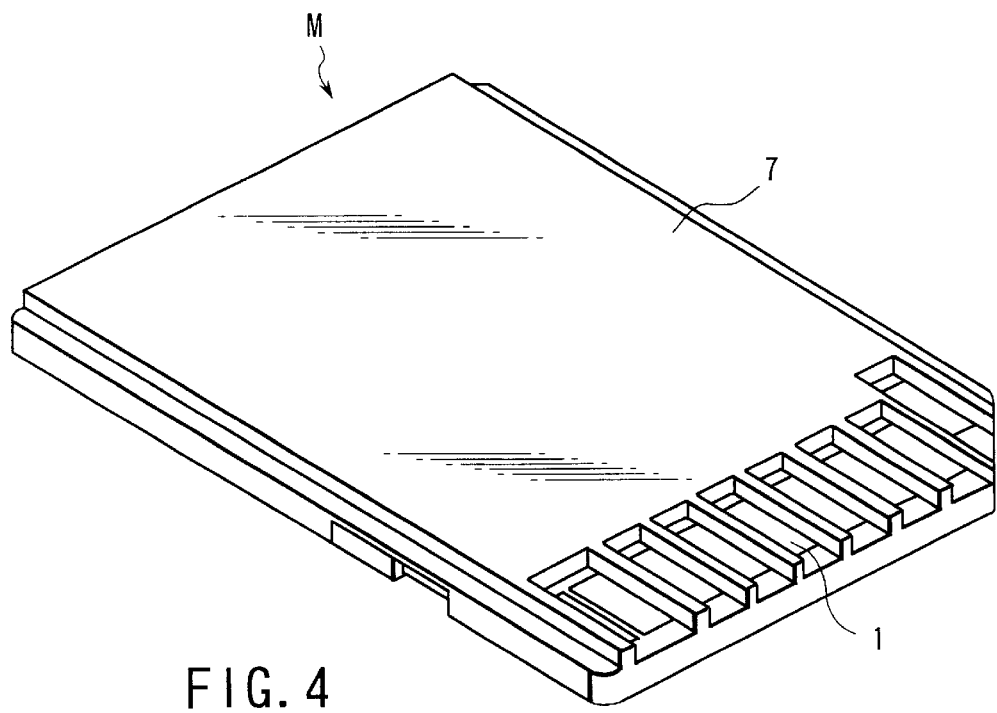
FIG. 4 shows the internal structure of the memory card.

The memory card M comprises a base board 2 provided with external connection terminals 1. A memory control LSI (a control circuit, a controller) 3, a memory (an external memory, a first memory) 4, chip components 5, and ICs of other types are installed on the base board 2. As shown in FIG. 4, the memory card is received in a case 7.

The external connection terminals 1 of the base board 2 are coated with a hard gold plating layer, so as to improve the contact-resistant characteristic.

The base board is coated with a soft gold plating layer on the surface 2a that is reverse to the surface where the external connection terminals 1 are provided.

On surface 2a, the memory control LSI 3 (which is a bare chip for memory control) is die-bonded. The base memory control LSI 3 is connected to the base board by gold wire bonding and is covered with sealing resin 8. Thereafter, the memory 4, which is of a TSOP type, the chip components 5 and the ICs are installed by soldering.

Since the memory control LSI 3 is installed on the base board 2 by bare chip installation, the key data cannot be easily analyzed.

The control circuit of the memory card M will be described with reference to FIG. 5.

Figure 5:
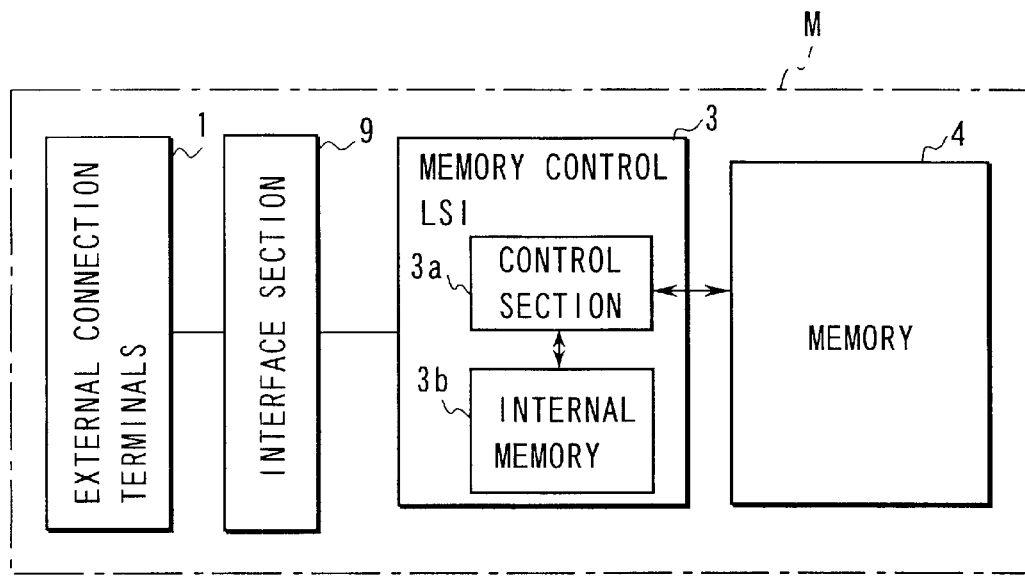
FIG. 5 is a control block diagram of the memory card.

As shown in FIG. 5, the memory card M is made up of: external connection terminals 1 through which data are exchanged with reference to an external apparatus (not shown); an interface section 9 connected to the external connection terminals 1; a memory control LSI 3 connected to the interface section 9; and the memory 4, connected to the memory control LSI 3, for controlling the storing/reproduction of data. The interface section 9 is made of chip components 5 and ICs 6.

The memory control LSI 3 includes a control section 3a for controlling the entire memory, and an internal memory (a second memory) 3b for storing a control program and data.

When the memory card M is connected to the external apparatus (not shown), power supply voltage is applied thereto.

[First Embodiment]

A description will be given of an embodiment wherein the memory 4 is certified by use of the certification key unalterably stored in the internal memory 3b and the certification key unalterably stored in the memory 4.

Figure 6:
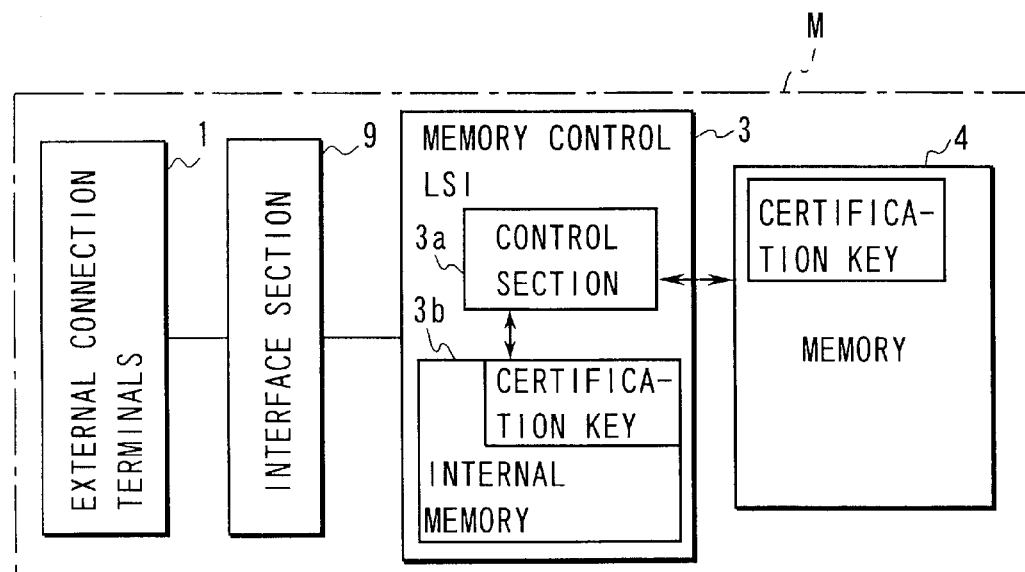
FIG. 6 shows an example of a manner in which a certification key is stored according to the first embodiment.

A unique value serving as a certification key is stored in the internal memory 3b, as shown in FIG. 6. The value is unalterably stored.

Each of the memory 4 and the internal memory 3b is made up of an unalterable ROM portion and an alterable ROM portion. The certification key is stored in the unalterable ROM portion.

Figure 7:
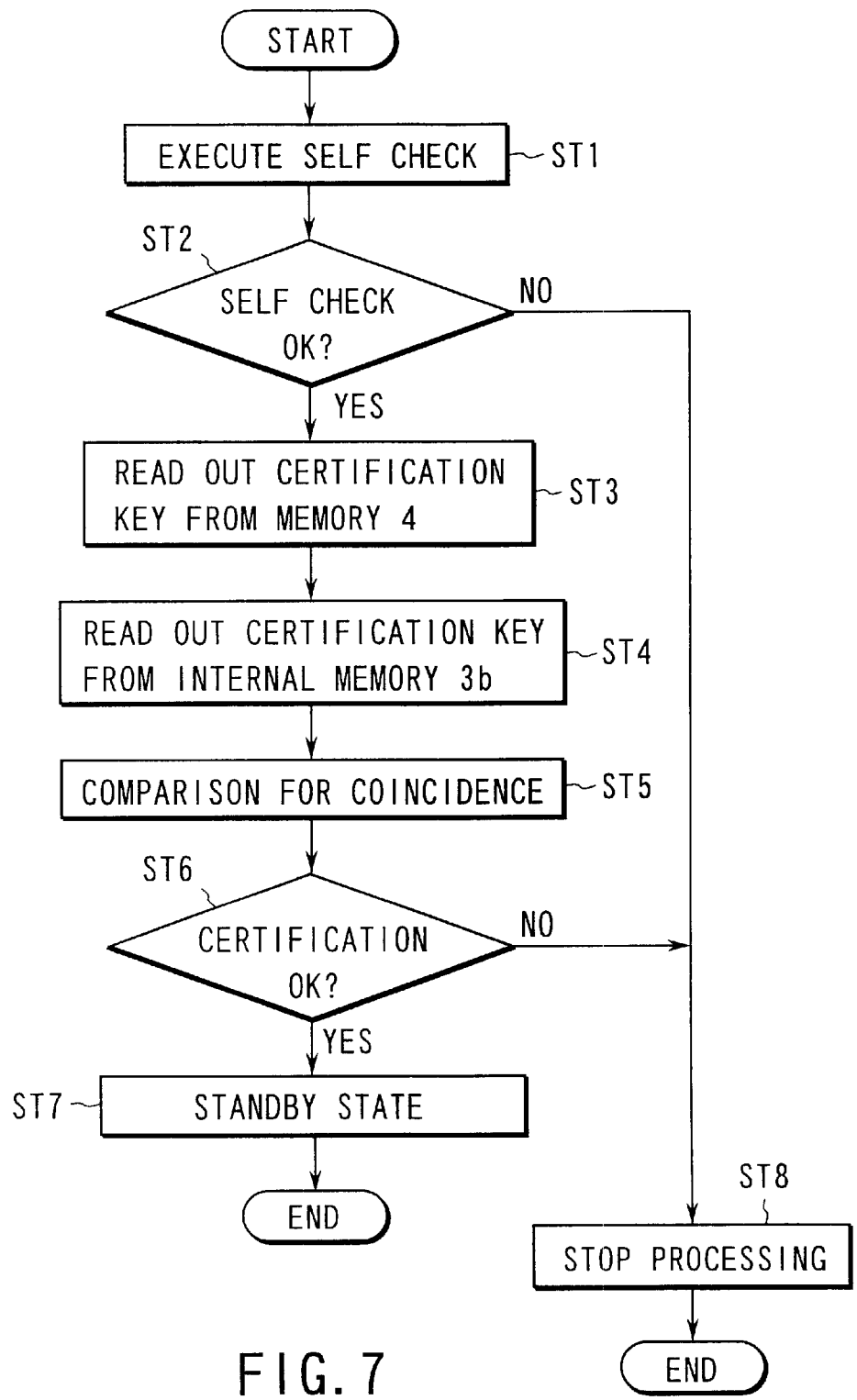
FIG. 7 is a flow chart illustrating the processing that is performed when the memory card of the first embodiment is actuated or when power supply voltage is applied.

With reference to the flowchart shown in FIG. 7, a description will be given of the processing that is performed when the memory card of the first embodiment is actuated or when power supply voltage is applied.

First of all, the control section 3a executes a self check (ST 1) when the card is actuated or when a power supply voltage is applied from the external apparatus. If the self check shows "OK" in step (ST 2), the control section 3a reads out the certification key from the memory 4 (ST 3), and further reads out the certification key from the internal memory 3b (ST 4). Then, the control section 3a compares the two keys, for coincidence (ST 5).

If the comparison shows that the two keys coincide with each other, the control section 3a certifies the memory 4 (certification "OK") (ST 6). Then, the control section 3a is set in the standby state (ST 7).

If the self-check in step ST 2 indicates "NG" or if the certification of step S6 indicates "NG", the control section 3a stops processing (ST 8).

If step 2 shows that the certification is "NG", this means that the comparison in step 5 indicates the key discrepancy and the memory 4 is not the certified one.

In the above, reference was made to the case where the memory 4 is certified when the card is actuated or when the power supply voltage is applied to the external apparatus. It should be noted, however, that the memory may be certified in a similar manner each time it is accessed.

The memory 4 may be accessed when music information or a program externally supplied is stored, or when the music information or program stored in the memory 4 is reproduced or executed.

Figure 8:
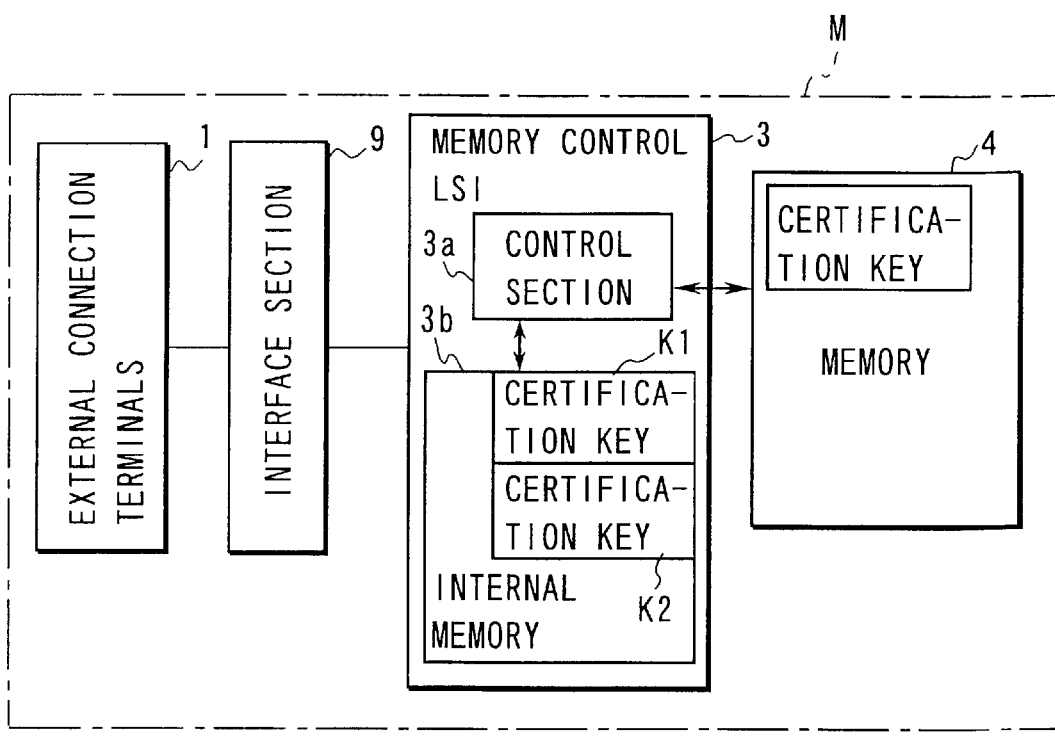
FIG. 8 shows an example of a manner in which a certification key is stored according to the first embodiment.

The certification key, which is stored in the internal memory 3b for certification of the memory 4, may be used for certifying the relationship between the external apparatus and the card M. As shown in FIG. 8, moreover, the internal certification key K1 for certifying the memory 4 and the external certification key K2 for certifying the external apparatus can be stored in the internal memory 3b of the card M.

[Second Embodiment]

By use of the above structure, the memory control LSI 13 can store the state of the memory 4 (i.e., the manner of processing). When the memory 4 is accessed next, the state information, which indicate the state of the memory 4, are checked to see whether or not they remain the same since the last-time access. Based on this check, the memory 4 is certified.

In the case of the second embodiment, the control section 3a stores the state information on the memory 4 in the internal memory 3b when the processing using the memory card M comes to an end, as shown in FIG. 9. The state information on the memory 4 include: the area used at the last processing (FAT: a file allocation table); a check sum of the whole of the memory 4 (a verification value); a check sum stored in the memory 4 at the end of the last-time processing (a verification value); etc. By this storing, the internal memory 3b stores information regarding the area used at the last processing (FAT: a file allocation table); a check sum of the whole of the memory 4 (a verification value); a check sum stored in the memory 4 at the end of the last-time processing (a verification value); or the like.

The memory 4 described above is a nonvolatile memory and can retain the state in which the memory 4 is in the last-time processing. The internal memory 3b is also a nonvolatile memory and can hold state information on the memory 4.

Figure 10:
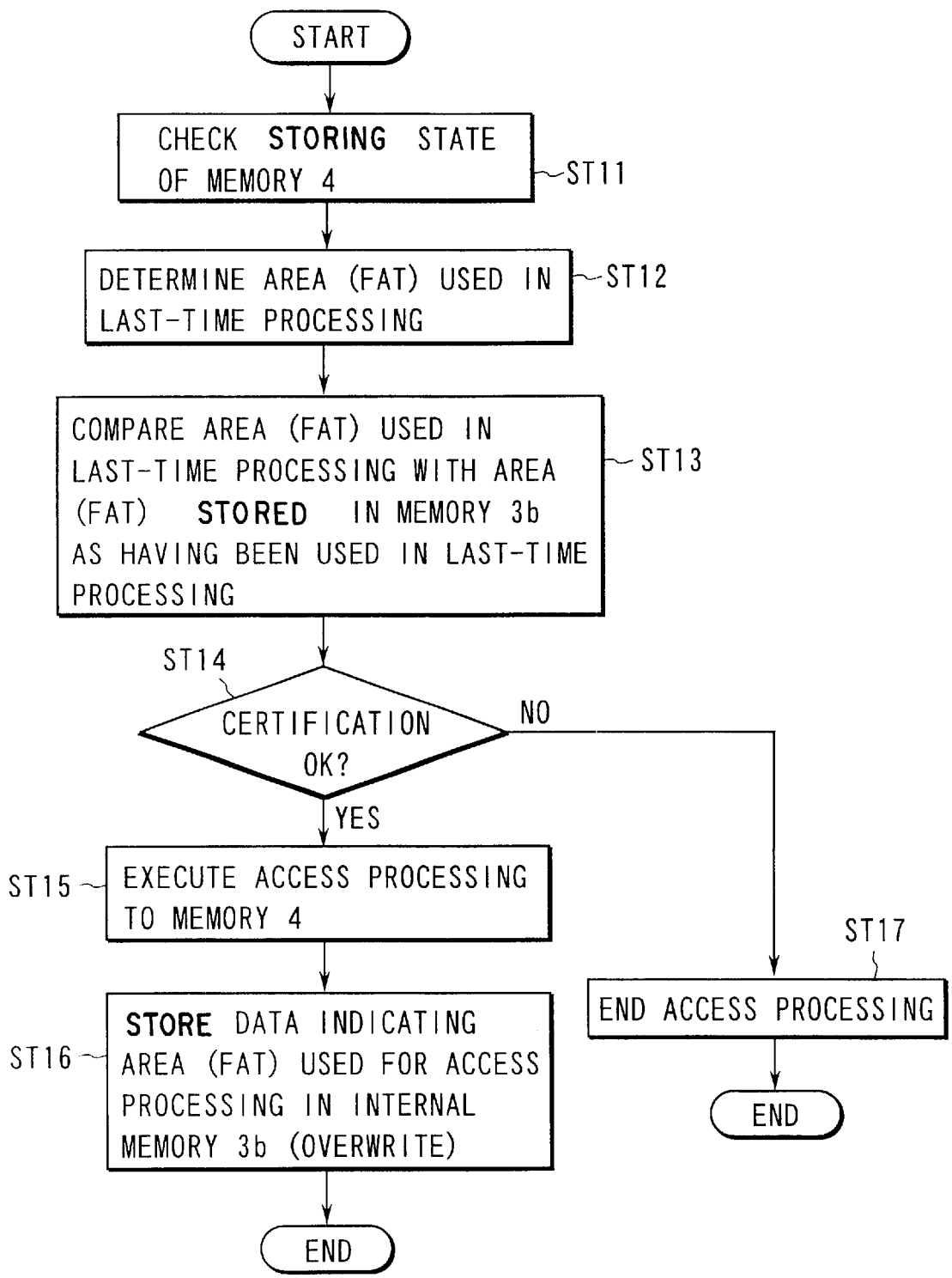
FIG. 10 is a flowchart illustrating how certification processing is performed according to the second embodiment.

A description will be given as to how certification processing is performed when the memory 4 is accessed by use of the above structure. In the description below, the flowchart shown in FIG. 10 will be referred to.

The memory 4 may be accessed when music information or a program externally supplied is stored, or when the music information or program stored in the memory 4 is reproduced or executed.

When the memory 4 is to be accessed, the control section 3a checks the storing state of the memory 4 (ST 11) and determines which area (FAT) was used in the last-time processing (ST 12). Then, the control section 3a compares this area (FAT), i.e., the area determined as having been used in the last-time processing, with the area (FAT) registered in the memory 3b as having been used in the last-time processing (ST 13).

If the comparison shows that the two areas coincident with each other, the control section 3a determines that the memory 4 is certified (certification "OK") (ST 14). Then, the access processing to the memory 4 is started (ST 15). The access processing is, for example, the storing (writing) of data, or the reproduction (reading) of stored data.

After the execution of the access processing, the control section 3a stores the data indicating the area (FAT) used for the access processing in the internal memory 3b (overwrite) (ST 16).

If the comparison in step ST 16 indicates the area discrepancy, the control section 3a determines that the certification is "NG" and therefore ends the access processing (ST 17).

In the above description, reference was made to a FAT as indicating the state information on the memory 4. Needless to say, the check sum of the whole of the memory 4 (a verification value), a check sum stored in the memory 4 at the end of the last-time processing (a verification value) or the like may be used in a similar manner.

Figure 12:
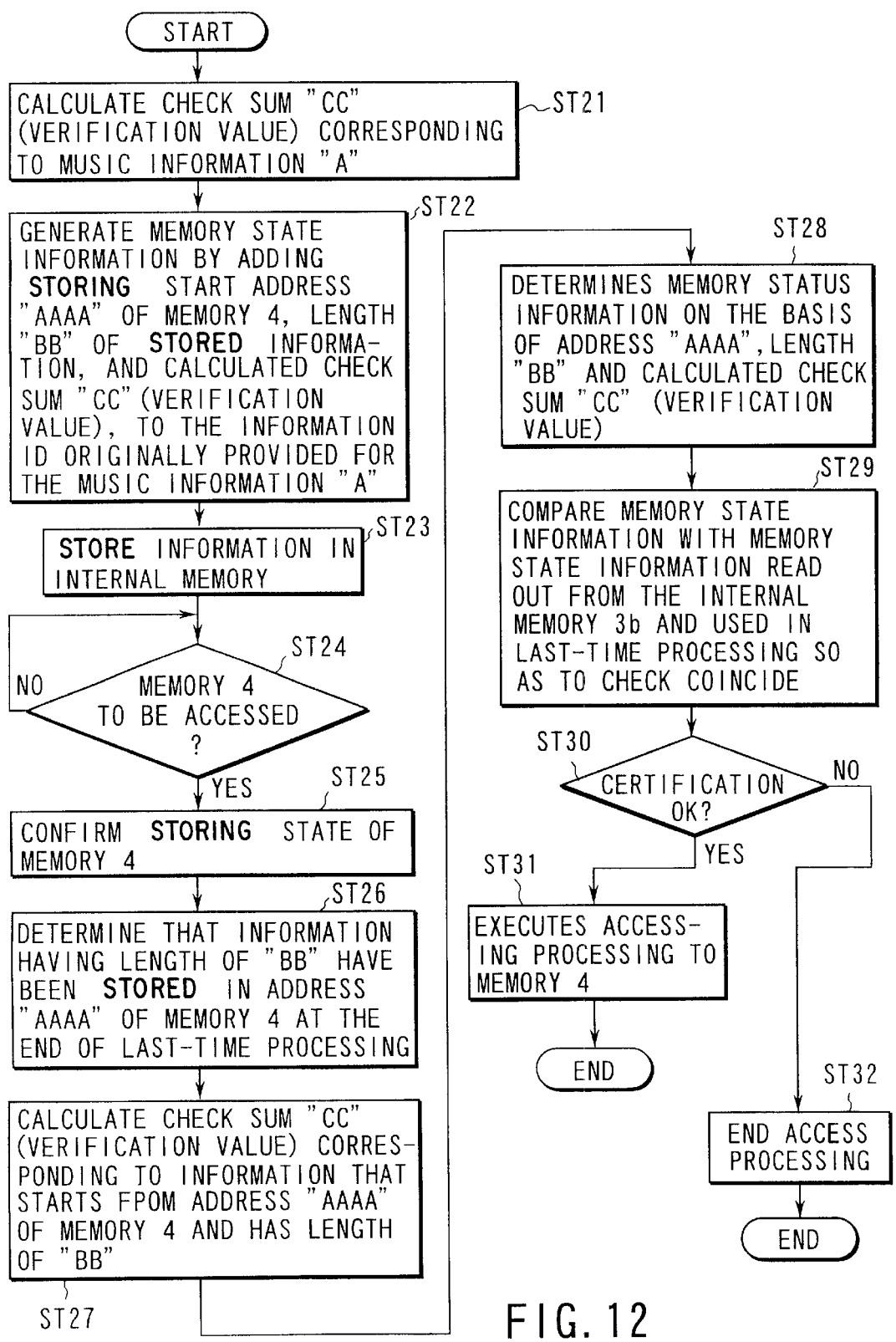
FIG. 12 is a flowchart illustrating how memory state information are stored and certification processing is performed according to the second embodiment.

Let us assume a case where at the end of the last-time processing, music information "A" are stored in address "AAAA" of the memory 4 to have length of "BB", as shown in FIG. 11. A description will be given as to how, in this case, the processing for storing the memory state information and the certification processing are executed, with reference to the flowchart shown in FIG. 12.

First of all, the control section 3a calculates a check sum "CC" (a verification value) corresponding to the music information "A" (ST 21).

Subsequently, the control section 3a generates memory state information (ST 22) by adding the following three to the information ID originally provided for the music information "A": (i) the storing start address "AAAA" of the memory 4; (ii) the length "BB" of the stored information; and (iii) the check sum "CC" (a verification value) calculated as above. The memory state information, thus generated, are stored in the internal memory 3b (ST 23), as shown in FIG. 13.

When the memory 4 is about to be accessed (ST 24), the control section 3a confirms the stored state of the memory 4 (ST 25) and determines that information having a length of "BB " were stored in address "AAAA" of the memory 4 at the end of the last-time processing (ST 26).

Then, the control section 3a calculates the check sum "CC" (a verification value) corresponding to the information that starts from address "AAAA" of the memory 4 and has a length of "BB" (ST 27).

On the basis of the address "AAAA", the length "BB" and the calculated check sum "CC" (a verification value), the control section 3a determines memory status information (ST 28). The memory state information are compared with the memory state information read out from the internal memory 3b and used in the last-time processing so as to see whether they coincide with each other (ST 29).

If the comparison indicates coincidence of information, the control section 3a certifies the memory 4 (certification "OK") (ST 30) and executes the accessing processing to the memory 4 (ST 31).

If the comparison in step 29 indicates a discrepancy of information, the control section 3a determines that the certification is "NG" and ends the access processing (ST 32).

[Third Embodiment]

A description will now be given of an embodiment wherein the memory 4 is certified by using: encoding data for the certification key unalterably stored in the memory 4; the certification key unalterably stored in the internal memory 3b; the decoding program; and the encoding key.

Figure 14:
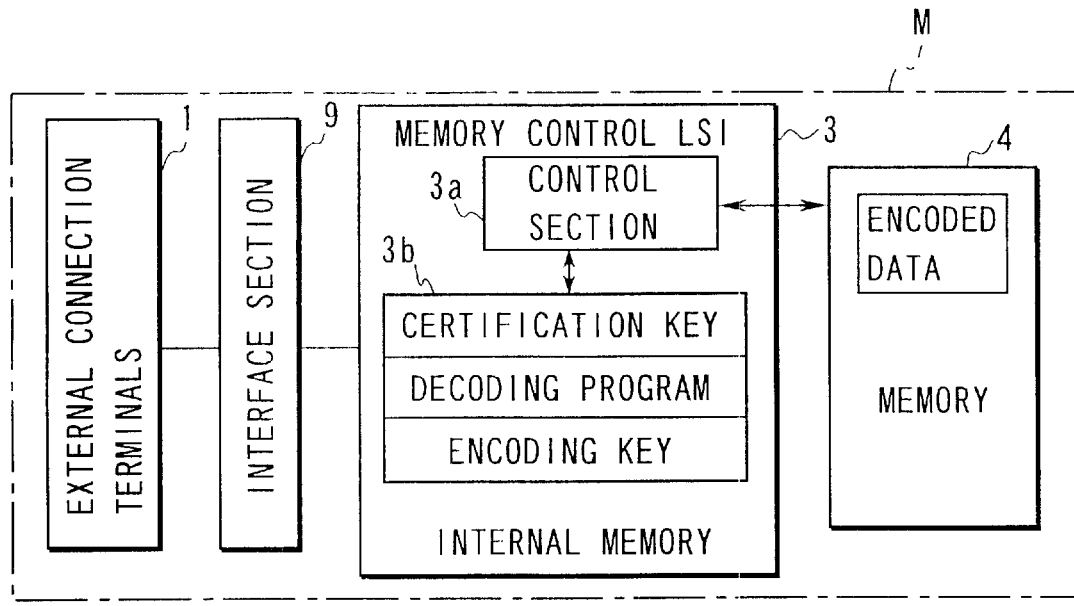
FIG. 14 shows how encoded data, a certification key, an encoding key and a decoding program are stored according to the third embodiment.

In the case of this embodiment, the memory 4 stores encoded data obtained by encoding a certification key by use of a unique certification key, as shown in FIG. 14. The encoded data are unalterably stored.

As shown in FIG. 14, the internal memory 3b stores a certification key that is identical to the certification key used before the encoding of the encoded data stored in the memory, a decoding program used for decoding the encoded data stored in the memory 4, and an encoding key used when the encoded data are decoded in accordance with the decoding program. The keys and program are stored unalterably.

Each of the memory 4 and the internal memory 3b is made up of an unalterable ROM portion and an alterable ROM portion. The certification key is stored in the unalterable ROM portion.

Figure 15:
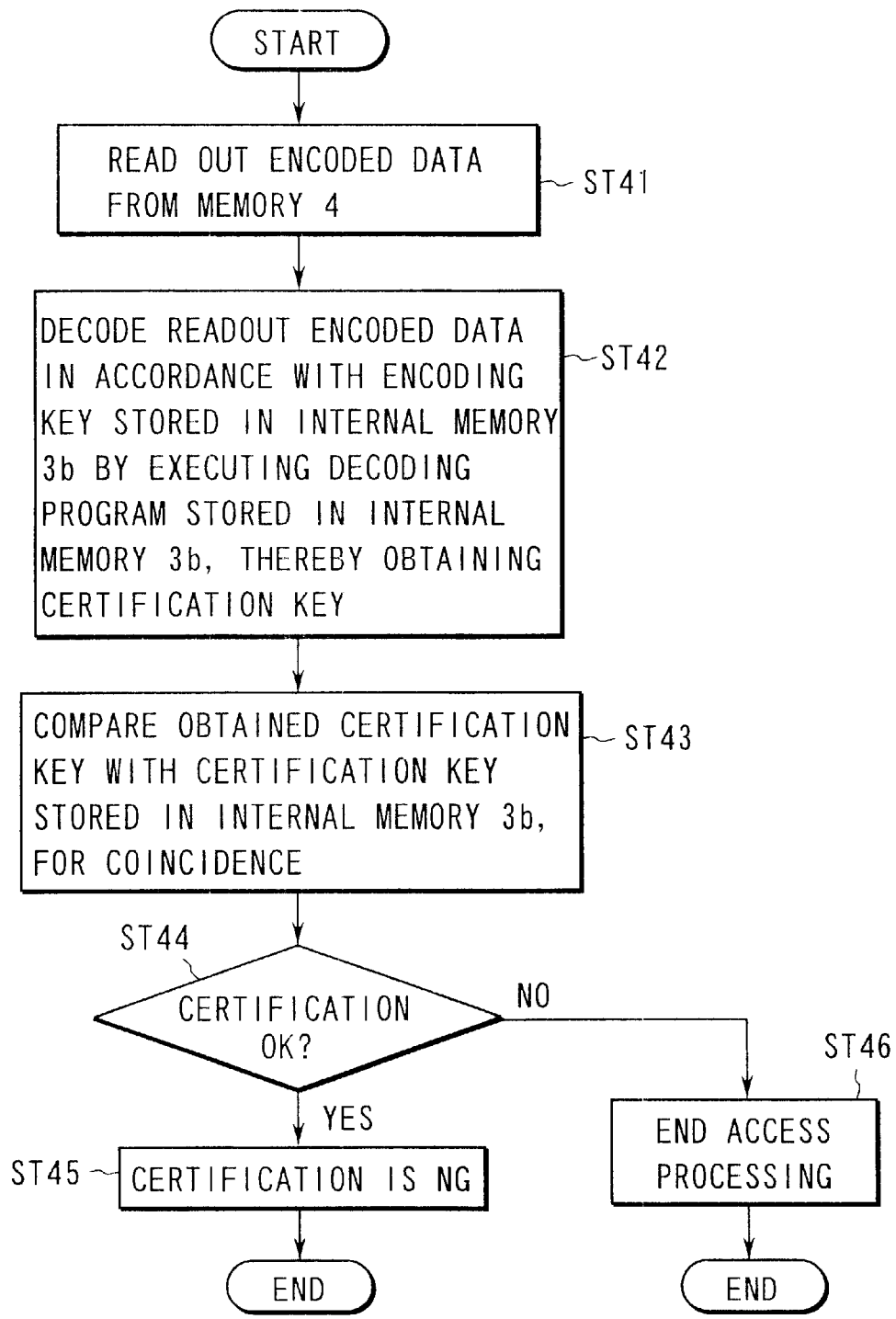
FIG. 15 is a flowchart illustrating how certification processing is performed according to the third embodiment.

A description will be given, with reference to the flowchart shown in FIG. 15, as to how the memory 4 is certified by use of the structure described above.

First of all, the control section 3a reads out the encoded data from the memory 4 (ST 41). Then, the control section 3a decodes readout encoded data in accordance with the encoding key stored in the internal memory 3b. For this decoding operation, the decoding program stored in the internal memory 3b is executed. As a result, a certification key is obtained (ST 42). Further, the control section 3a compares that certification key with the certification key stored in the internal memory 3b (ST 43), for coincidence.

If the comparison indicates coincidence between the certification keys, the control section 3a certifies the memory 4 (certification "OK") (ST 44).

If the comparison in step 43 indicates a discrepancy, the control section 3a determines that the certification is "NG" (ST 45).

Figure 16:
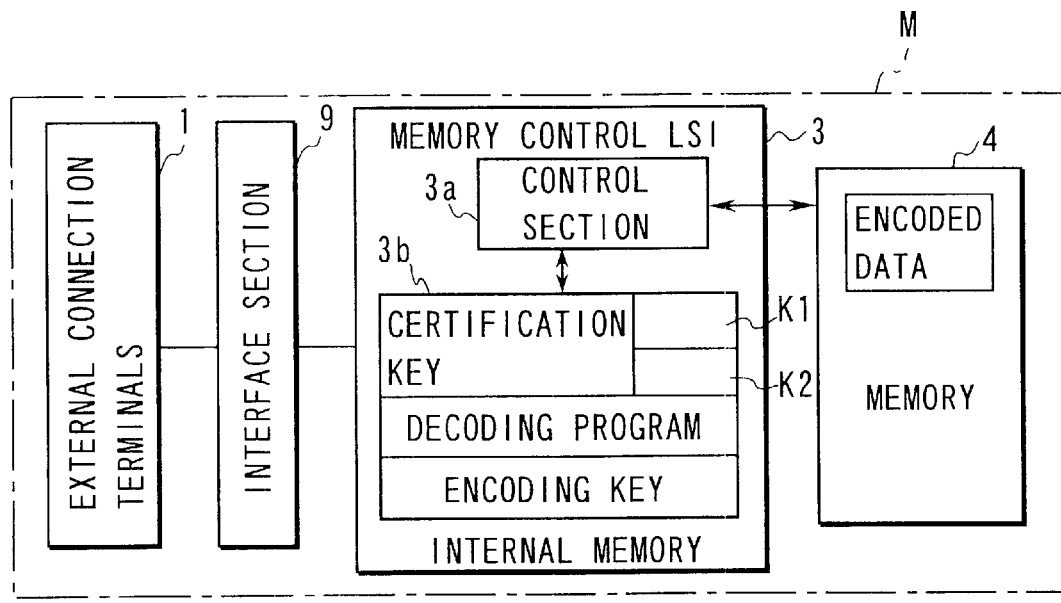
FIG. 16 shows how encoded data, a certification key, an encoding key and a decoding program are stored according to the third embodiment.

The certification key, which is stored in the internal memory 3b for certification of the memory 4, may be used for certifying the relationship between the external apparatus and the card M. As shown in FIG. 16, moreover, the internal certification key K1 for certifying the memory 4 and the external certification key K2 for certifying the external apparatus can be stored in the internal memory 3b of the card M.

[Fourth Embodiment]

A description will now be given of an embodiment wherein the memory 4 is certified by executing both the certification processing (steps 41–45) of the third embodiment and the certification processing (steps 11–14) of the second embodiment. The memory 4 is certified when data are received from an external apparatus and stored in the memory 4.

Figure 17:
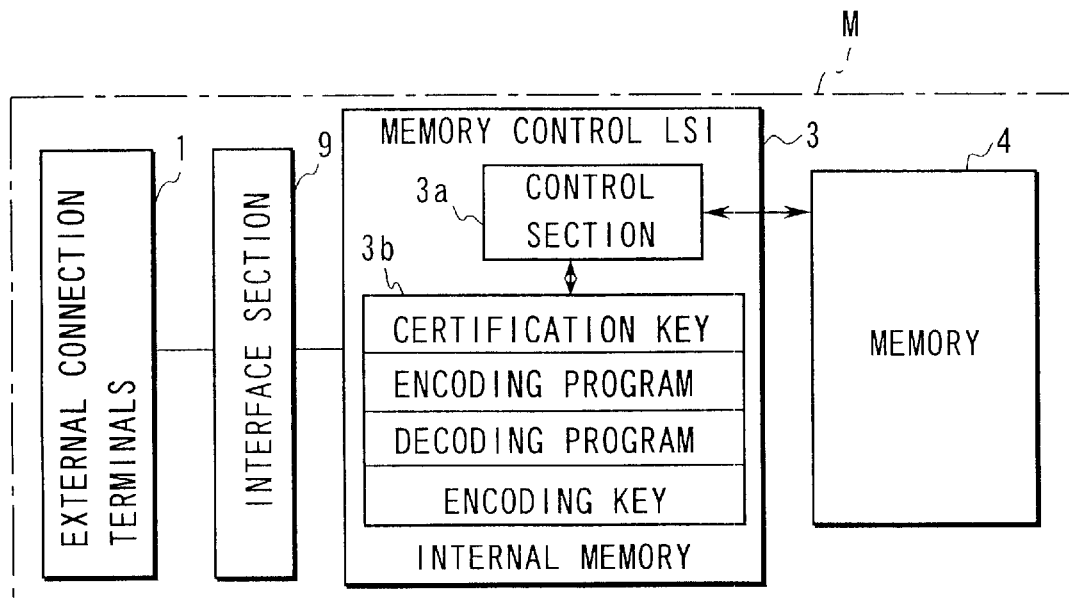
FIG. 17 shows how encoded data, a certification key, an encoding key, a decoding program and an encoding program are stored according to the fourth embodiment.

In the case of the fourth embodiment, encoded data, which are obtained by encoding a certification key in accordance with a unique encoding key, are stored beforehand, as shown in FIG. 17. The encoded data are unalterably stored.

As shown in FIG. 17, the internal memory 3b stores a certification key that is identical to the certification key used before the encoding of the encoded data stored in the memory 4, an encoding program used for encoding reception data received from the external apparatus, a decoding program used for decoding the encoded data stored in the memory 4, and an encoding key used when the reception data are encoded in accordance with the encoding program or when the encoded data are decoded in accordance with the decoding program. The keys and programs are stored unalterably.

As shown in FIG. 17, the internal memory 3b information regarding the area used at the last processing (FAT: a file allocation table); a check sum of the whole of the memory 4 (a verification value); a check sum stored in the memory 4 at the end of the last-time processing; or the like.

Each of the memory 4 and the internal memory 3b is made up of an unalterable ROM portion and an alterable ROM portion. The certification key is stored in the unalterable ROM portion. The alterable ROM portion is a nonvolatile memory and retains the state in which the memory 4 is in the last-time processing.

Figure 18:
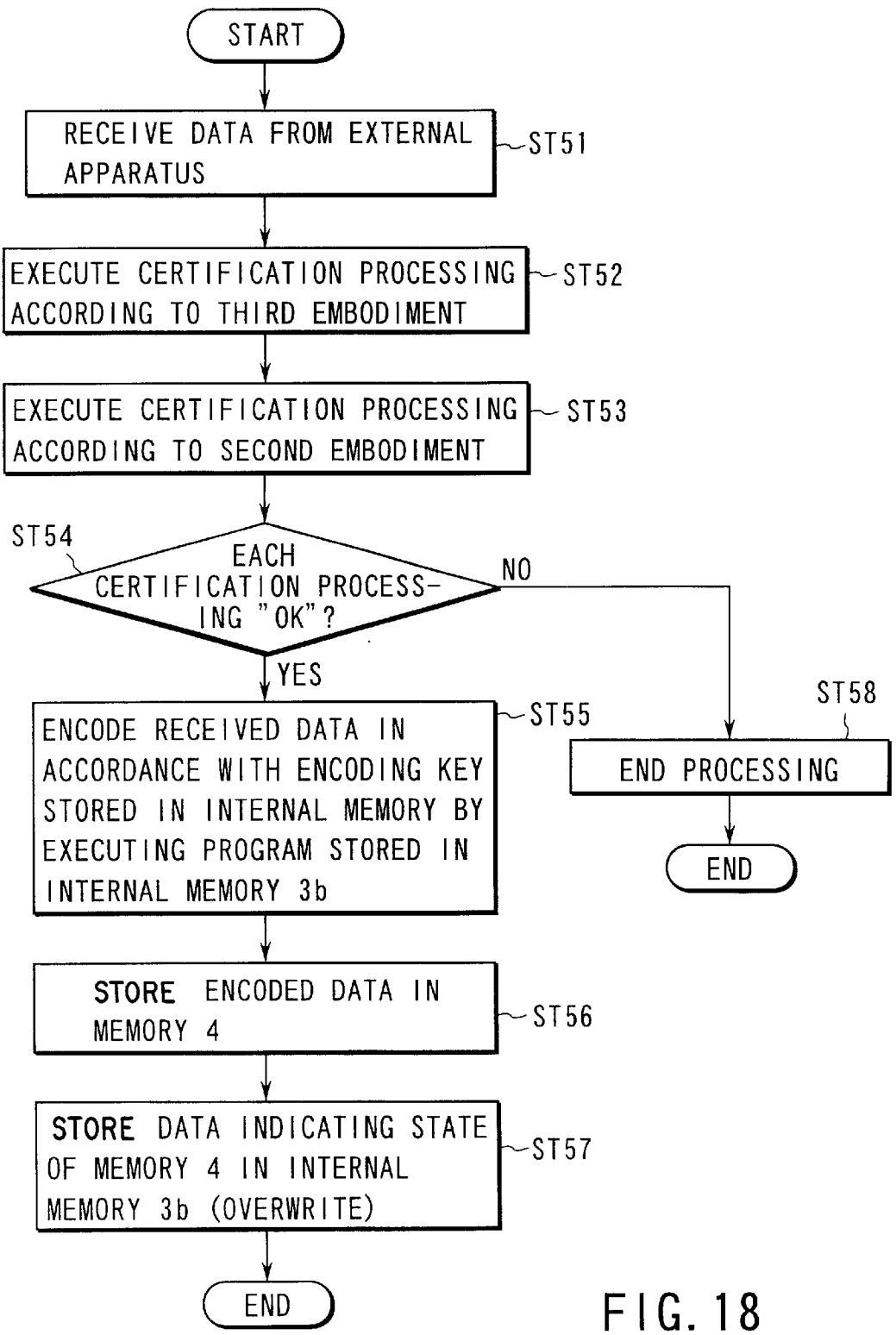
FIG. 18 is a flowchart illustrating how certification processing is performed according to the fourth embodiment.

A description will be given, with reference to the flow-chart shown in FIG. 18, as to how the certification processing is executed upon reception of data from the external apparatus by use of the structure described above.

Upon reception of data from the external apparatus (ST 51), the control section 3a executes the certification processing (ST 52) according to the third embodiment, and further executes the certification processing (ST 53) according to the second embodiment.

If each certification processing is "OK" (ST 54), the control section 3a encodes the received data (ST 55) in accordance with the encoding key stored in the internal memory 3b. For this encoding operation, the encoding program stored in the internal memory 3b is executed.

Then, the control section 3a stores the encoded data in the memory 4 (ST 56).

After this storing operation, the control section 3a stores the data indicating the state of the memory 4 in the internal memory 3b (overwrite) (ST 57).

If either certification processing is "NG", the control section 3a ends the processing (ST 58).

When the encoded data stored in the memory 4 is decoded for reproduction, the decoding operation is performed in a similar manner to that described above.

The data to be stored in the memory 4 may be music information or a program.

Figure 19:
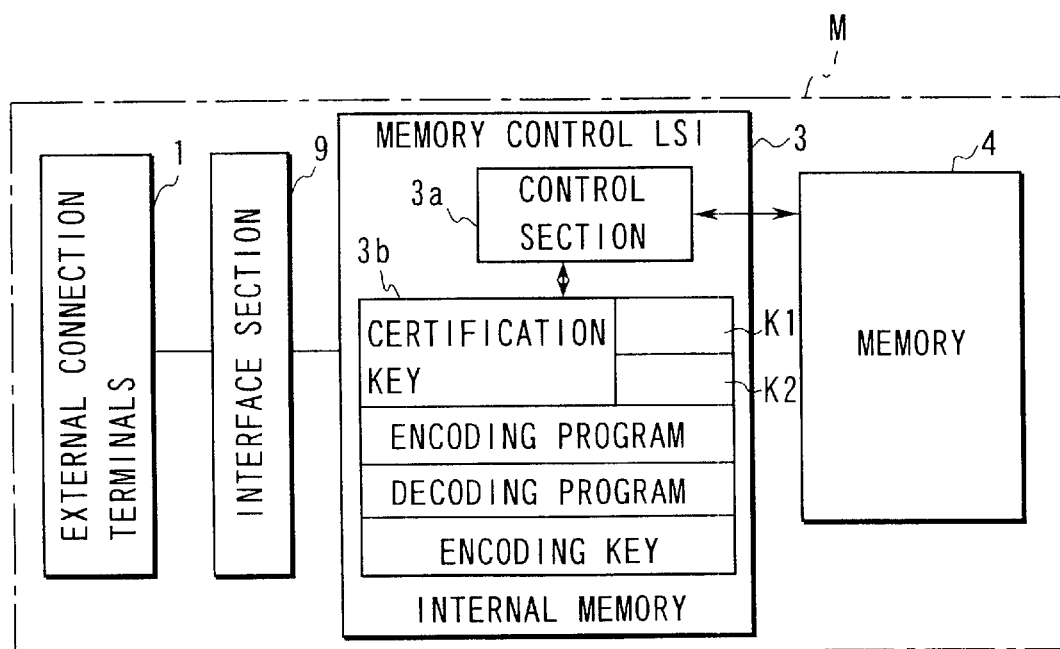
FIG. 19 shows how encoded data, a certification key, an encoding key, a decoding program and an encoding program are stored according to the fourth embodiment.

The certification key, which is stored in the internal memory 3b for certification of the memory 4, may be used for certifying the relationship between the external apparatus and the card M. As shown in FIG. 19, moreover, the internal certification key K1 for certifying the memory 4 and the external certification key K2 for certifying the external apparatus can be stored in the internal memory 3b of the card M.

[Fifth Embodiment]

A description will now be given of a manner in which a memory card M having the certification function described above is used.

By way of example, how the memory card M is employed in an internet connection system will be described with reference to FIGS. 20 and 21.

Figure 20:
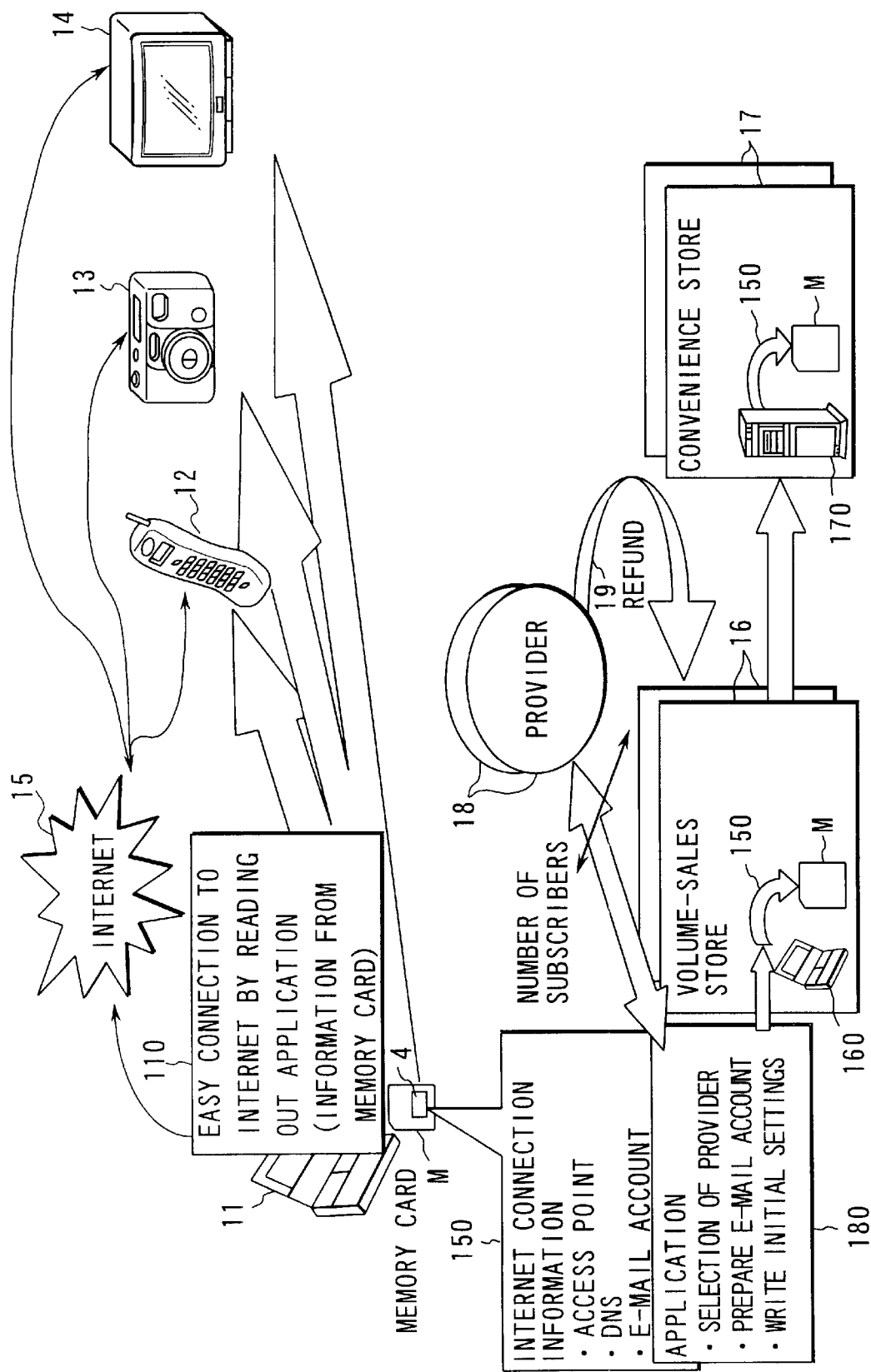
FIG. 20 shows the entire Internet connection system according to the fifth embodiment.
Figure 21:
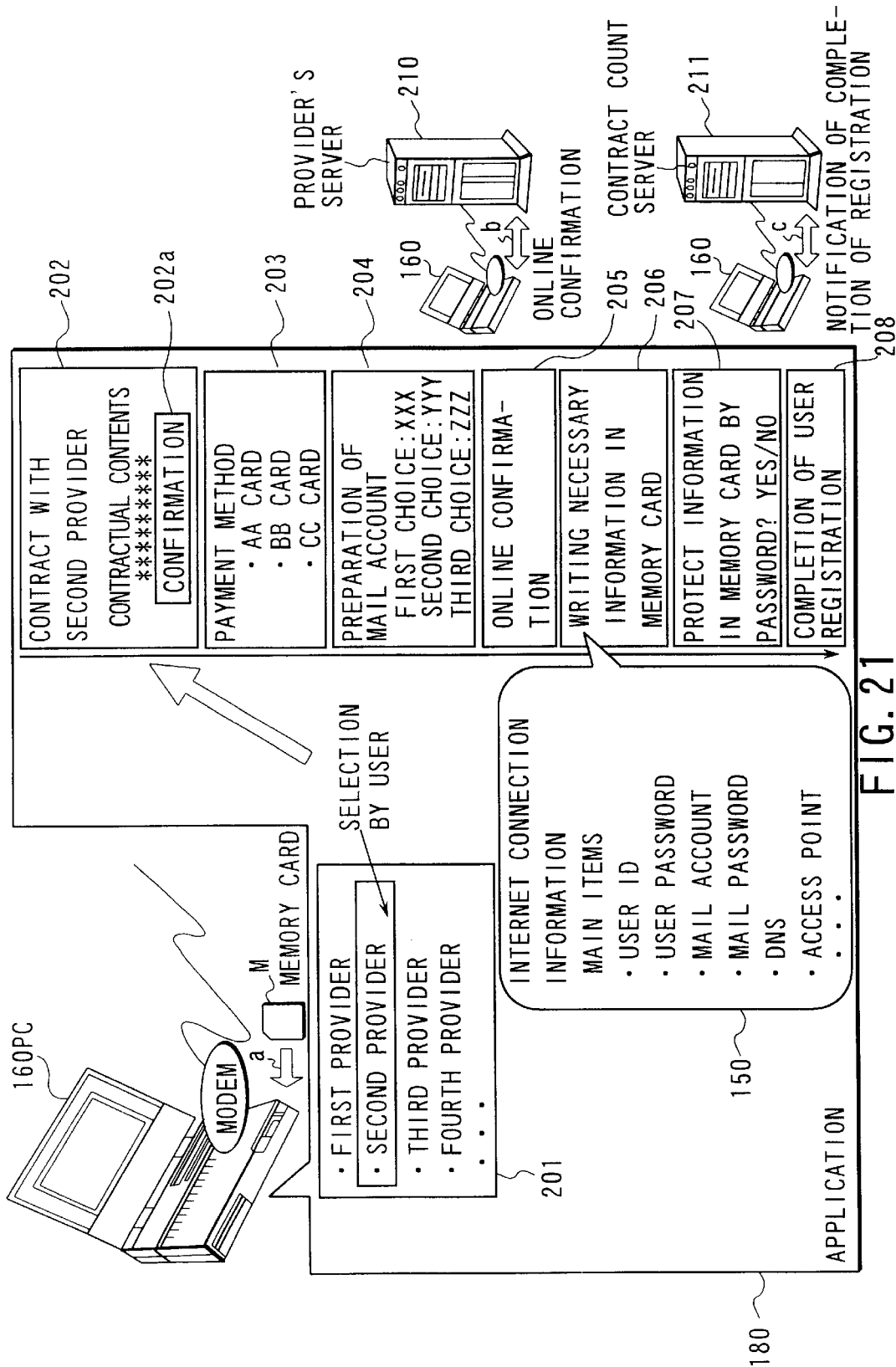
FIG. 21 illustrates how the Internet connection system of the fifth embodiment is used in a volume-sales store so as to register Internet connection information in a memory card.

FIG. 20 shows the internet connection system to which the memory card M capable of certifying an incorporated memory is applied.

Referring to FIG. 20, each of electronic devices, such as a PC (personal computer) 11, a cellular phone (or a mobile phone) 12, an electronic camera and a TV (television) set 14, is provided with a card slot and a communication interface (not shown). The card slot is designed to receive a memory card M which is substantially equal in size to a postage stamp. The memory card M includes a hidden storage area which cannot be externally accessed. The communication interface is required for connection to the Internet 15, etc., and an example of the communication interface is a modem.

According to the present embodiment, the memory 4 of the memory card M stores Internet connection information 150, including a user ID, a user password, a mail account, a mail password, a DNS server address, an access point (a telephone number for access), etc. The data format of the Internet connection information 150 registered in the memory 4 of the memory card M is predetermined without reference to the types of electronic devices (namely, the PC 11, cellular phone 12, electronic camera 13 and the TV set 14 described above).

When a memory card M is inserted in the card slot, the PC 11 is automatically booted up and reads out the Internet connection information 150 of the predetermined format from the memory 4 of the card M. This memory 4 stores an application program 110 used for automatic connection to the Internet 15 (i.e., an Internet connection setting application program 110). When the memory card M is actuated, the processing for certifying an incorporated memory, i.e., the processing described in relation to the first, second and third embodiments, is executed. When the memory certification is "OK", the PC 11 (i.e., an external apparatus) can be certified by using the certification key stored in the memory 3b of the memory card M. When these certifications are "OK", the application program is executed.

The cellular phone 12, electronic camera 13, TV set 14 and other electronic devices are also provided with a storage medium that is readable by a computer. The storage medium stores an Internet connection setting application program (hereinafter referred to simply as an "application"). The storage medium is made of a ROM, a disk drive, a flash memory, etc. The application 110 may be downloaded through a communication line.

As described above, each of the electronic devices (the PC 11, the cellular phone 12, the electronic camera 13, etc.) is provided with an application (i.e., an Internet connection setting application). With this structure, what is required of the user is merely to carry the memory card M, the memory 4 of which stores the Internet connection information 150, and insert it in the card slot of an arbitrary one of the electronic devices (namely, the PC 11, the cellular phone 12, the electronic camera 13 or the TV set). By so doing, connection to the Internet 15 can be easily established. The memory card M is not designed to be dependent on any specific one of the electronic devices. In other words, the user can choose an electronic device to be used, and insert the memory card M in the card slot of the chosen device. By merely doing so, the user can be connected to the Internet through the device.

In connection with this embodiment, a description will be given of a shop that registers the Internet connection information 150 in the memory 4 of the memory card M. A customer (i.e., the user) takes a memory card M to the shop or buys one from the shop. Then, the customer asks the shop to register the Internet connection information in the memory 4 of the memory card M. In the case illustrated in FIG. 20, a volume-sales store 16 and a convenience store 27 register the Internet connection information. For this registration, a PC 160 in the volume-sales store 16 is provided with a computer-readable storing medium, and this storing medium stores information 180 used for the registration of Internet connection information (i.e., an Internet connection information registration application program). The convenience store 17 is provided with an information write terminal 170, and the storing medium of this terminal 170 stores not only an application used for registering internet connection information in the memory 4 of the memory card M (i.e., an internet connection information-registration application) but also an application used for downloading digital contents to the memory card M or an MD (i.e., a mini-disk).

In this manner, the volume-sales store 16 and the convenience store 17 serve as service shops that can register Internet connection information. Owing to the registration service by these shops, users (subscribers) who made a contract with Internet providers 18 (hereinafter referred to simply as providers) can be counted according to the providers 18 or the service shops. Each provider 18 can therefore give a refund 19 to a system provider (i.e., a company that provides an Internet connection system using a portable storing medium) or the service shops (i.e., the shops that registers Internet connection information, such as the volume-sales shop 16 and convenience store 17) in accordance with the number of subscribers 19.

A description will now be given as to how the Internet connection information registration service shop registers (writes) Internet connection information in the memory 4 of the memory card M by use of the system shown in FIG. 20. In the following below, FIG. 21 will be referred to.

When the memory card of the user is inserted in the card slot of the PC 160, as indicated by arrow a, the Internet connection information-registration application 180 is started. A list of providers (a provider list menu) 201 is shown on the display unit of the PC 160. (The providers make a contract with the company that provides the system shown in FIG. 20.)

On the provider list menu 201, the user selects a provider or a salesperson of the volume-sales store 16 selects one provide the provider requested by the user. In response to this selection, the PC 160 executes the application 180 and displays a message 202 indicating subscriber contract contents corresponding to the selected provider. A confirmation button 202a is included in the menu, and when the confirmation button is pushed (selected), a payment method selection menu 203 is displayed. When a payment method is selected on this menu, then a mail account preparation menu 204 is displayed. After mail accounts desired by the user are entered, the PC 160 is connected to the server 210 of the provider designed by the user (the connection is established through the Internet). The payment method and mail accounts desired by the user are therefore sent to the server 210. A confirmation request is subsequently made, as indicated by arrow b, and an online confirmation message 205 is displayed.

The server 210 of the provider designated by the user checks the mail accounts desired by the user to see whether they have been already assigned to another user. This check is made in the order of the first to third choices. If one of the mail accounts has not yet been assigned, it is determined that the mail account in question is assigned to the user. If all mail accounts have been already been assigned, the server 210 requests that different mail accounts be entered from the PC 160 of the volume-sales shop 16.

After determining a mail account desired by the user and assigning it to the user, the server 210 determines a user ID, a user password and a mail password, which are to be assigned to the user. The information on these are transmitted to the PC 160 of the volume-sales store 16, along with the information required for the Internet connection, including a DNS server address and an access point.

On the basis of the information transmitted from the server 210 of the provider, the PC 160 of the volume-sales store 16 generates Internet connection information 150 of predetermined format. The Internet connection information include a user ID, a user password, a mail password, a DNS server address, and an access point. The Internet connection information 150 are encoded according to a predetermined algorism by use of a media key, which will be described below. When the operation for writing the encoded information in the memory 4 of the memory card M inserted in the card slot of the PC 160 has been started, a message 206 is displayed, indicating that information are being written.

When information are written in the memory 4 of the memory card M, the certification according to the fourth embodiment is executed. When the memory certification is "OK", the PC 11 (i.e., an external apparatus) can be certified by using the certification key stored in the memory 3b of the memory card M. When these certifications are "OK", the write operation is started.

After writing the Internet connection information 150 in the memory 4 of the memory card M, the PC 160 displays an inquiry message 207, asking the user whether or not to protect the information in the memory card M by use of a password.

If the protection based on a password is asked for, the PC 160 prompts the user to designate a password. Then, the PC 160 encodes the password designated by the user in accordance with a predetermined algorithm, and stores it in the memory card M. This encoded password is used as a key for taking out a media key from the memory card M. By writing the password in the memory card M, the PC 160 completes a series of operations for writing the Internet connection information, i.e., the user registration processing. Thereafter, the PC 160 displays a message 208 indicating the completion of user registration, and notifies a contract count server 211 of the completion of user registration through the Internet, as indicated by arrow c. The contract count server 211 is owned by the business proprietor that developed the present system (i.e., the system providing company). On the other hand, if the protection based on a password is not asked for, the PC 160 immediately displays the user registration completion message 208 and notifies the contract count server 211 of the user registration completion, as indicated by arrow c. The notification of the contract count server includes the transmission of the information regarding the provider with which the user made a contract.

The contract count server 211 stores the data on the number of users (subscribers) who made a contract with Internet providers, and the number of users is counted according to the providers or the Internet connection information registration service shops. Each time a notice of user registration completion is received from the PC 160 of the volume-sales shop 16, the contract count server 211 increases the number of subscribers to a provider by one, and the volume-sales shop 16 (i.e., the shop that performed the service of registering the Internet connection information for the connection to that provider) increases the number of subscribers by one.

As described above, data used as a key is written in an area of a memory, so as to prevent the fabrication of a counterfeit memory card. The memory control LSI certifies the key data, and access to the memory is allowed only when coincidence is detected.

Even if the memory of the memory card is replaced with a memory of greater storage capacity, the certification by the memory control LSI does not indicate coincidence, and access to the memory is therefore prevented.

To prevent analysis, the key data in the memory can be encoded.

The present invention relates to a memory card comprising: a memory for storing data; a control section for controlling the storing of data in the memory or controlling the reproduction of the data from the memory; and a memory control LSI including an internal memory used by the control section. The control section compares the certification key stored in the memory with the certification key stored in the internal memory, and determines coincidence or non-coincidence. Based on this determination, the memory is certified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A certification method for checking a portable electronic medium comprising:

a base board on which wiring is provided;

a first memory, installed on the base board, for storing data; and a control circuit including: a second memory for storing data; and a control section for controlling an operation of storing data in the first memory and an operation of reading the data from the first memory, said second memory and said control section being fabricated as a chip which is installed on the base board and connected to the base board, said second memory further storing, as first-memory-state information, a recording start address at which the first memory has started to store the data at last-time processing, a length of the data stored, and a checksum for the data defined by the recording start address and the length of the data;

wherein said certification method includes steps at which:

when access is made to the first memory the control section determines a recording start address at which the first memory has started to store the data at the last-time processing and a length of the data stored; calculates a checksum for the data defined by the recording start address and the length of the data, compares the recording start address, the length of the data and the calculated checksum with the recording start address, the length of the data and the checksum, respectively, stored in the second memory as the first-memory state information and verifies the first memory when the start addresses, lengths and checksums coincide.

2. A method according to claim 1, wherein:

said first memory is installed on the base board by soldering; and said second memory is a bare chip installed on the base board.

3. A method according to claim 1, wherein said first and second memories are nonvolatile memories.

4. A method according to claim 1, wherein said first memory is a nonvolatile memory, and said second memory includes a nonvolatile memory portion in which the first-memory-state information are stored.

5. A method according to claim 1, wherein:

said first memory and said control circuit are installed on one surface of the base board; and an external connection terminal, coated with a hard gold layer, is provided on another surface of the base board.

6. A method according to claim 1, wherein said second memory stores a control program for controlling the control section.

7. A method according to claim 1, wherein said first-memory-state information include at least one of: information indicating which area of the first memory is used at last-time processing; a verification value used at the end of the last-time processing; and a verification value regarding entity of the first memory.

8. A method according to claim 7, wherein said area of the first memory is defined by a start address and a data length.

* * * * *